(12) United States Patent
Bauer (10) Patent No.: US 12,334,763 B1
(45) Date of Patent: Jun. 17, 2025

(54) ELECTRICITY INTERRUPTER VEHICLE SAFETY DEVICE, SYSTEM AND METHOD

(71) Applicant: Everedge Solutions LLC, Orlando, FL (US)

(72) Inventor: Jose Antonio Bauer, Orlando, FL (US)

( * ) Notice: Subject to any disclaimer, the term of this patent is extended or adjusted under 35 U.S.C. 154(b) by 0 days.

(21) Appl. No.: 17/480,853

(22) Filed: Sep. 21, 2021

Related U.S. Application Data (60) Provisional application No. 63/081,624, filed on Sep. 22, 2020.

(51) Int. Cl.
*H02J 7/00* (2006.01)
*B60R 16/033* (2006.01)
*H02H 3/00* (2006.01)

(52) U.S. Cl.
CPC .......... *H02J 7/0032* (2013.01); *B60R 16/033* (2013.01); *H02H 3/00* (2013.01); *H02H 3/003* (2013.01); *H02J 2310/46* (2020.01)

(58) Field of Classification Search
CPC ... H02J 7/0032; H02J 2310/46; B60R 16/033; H02H 3/00; H02H 3/003
USPC .......................................................... 361/60
See application file for complete search history.

(56) References Cited

U.S. PATENT DOCUMENTS

| | | | | |
|---|---|---|---|---|
| 3,466,409 A | * | 9/1969 | Pernet | B60K 28/14 200/61.45 R |
| 4,000,408 A | * | 12/1976 | McCartney | H01H 35/14 200/61.5 |
| 4,191,868 A | | 3/1980 | Sunde | |
| 4,195,897 A | | 4/1980 | Plevjak | |
| 4,310,817 A | | 1/1982 | McNiel | |
| 4,397,372 A | * | 8/1983 | De Kraker | B60R 19/483 180/277 |
| 4,524,287 A | | 6/1985 | Brannen | |
| 5,053,588 A | | 10/1991 | Bolender | |
| 5,574,316 A | * | 11/1996 | Nieschulz | B60L 3/0023 335/15 |
| 5,777,285 A | | 7/1998 | Frank | |

(Continued)

FOREIGN PATENT DOCUMENTS

| | | |
|---|---|---|
| EP | 0683500 A1 | 11/1995 |
| EP | 2828118 B1 | 5/2019 |

(Continued)

*Primary Examiner* — Yemane Mehari
(74) *Attorney, Agent, or Firm* — JW Law, LLC; Joseph A. Wallace, Jr.

(57) ABSTRACT

Safety devices, systems, and methods for automatically interrupting power from electricity sources in a vehicle, such as a vehicle battery to prevent post car collision fires. A housing having an interior circumferential chamber formed between an upper section and a lower section, and a weighted metal ball positioned between upper and lower compressed springs in a midportion of the interior chamber so that an electrical path can pass through the housing. The interior chamber tapers down from interior walls about the midportion of the chamber to outer interior portions of the housing, the housing can be mounted to the positive terminal of a vehicle battery, where a collision causes the spring compressed ball to become dislodged breaking the electrical path interrupting electricity from the vehicle battery, and the ball becomes wedged inside the tapering down interior walls inside of the housing.

15 Claims, 13 Drawing Sheets

(56) References Cited

U.S. PATENT DOCUMENTS

| | | | |
|---|---|---|---|
| 6,111,327 A * | 8/2000 | Bae | H01H 3/503 |
| | | | 200/558 |
| 6,115,659 A | 9/2000 | Buchheim | |
| 6,424,899 B2 | 7/2002 | Imai | |
| 6,748,307 B1 | 6/2004 | Sala | |
| 7,460,344 B2 * | 12/2008 | Hastings | H02H 7/18 |
| | | | 361/42 |
| 9,539,889 B2 * | 1/2017 | Lim | H01M 10/48 |
| 2004/0243294 A1 | 12/2004 | Miyata et al. | |
| 2004/0256169 A1 | 12/2004 | Budzilovich | |
| 2005/0093371 A1 | 5/2005 | Zdziech | |
| 2006/0137929 A1 | 6/2006 | Yoshida | |

FOREIGN PATENT DOCUMENTS

| | | |
|---|---|---|
| JP | 2015120494 A | 7/2015 |
| JP | 2018538655 A5 | 7/2015 |
| KR | 101483685 B1 | 1/2015 |

* cited by examiner

ELECTRICITY INTERRUPTER VEHICLE SAFETY DEVICE, SYSTEM AND METHOD

CROSS REFERENCE TO RELATED APPLICATIONS

This application which claims the benefit of priority to U.S. Provisional Application Ser. No. 63/081,624 filed Sep. 22, 2020, the entire disclosure of which is incorporated herein by specific reference thereto.

FIELD OF INVENTION

This invention relates to vehicles, and in particular to safety devices, systems, and methods for automatically interrupting power from electricity sources in a vehicle, such as a vehicle battery to prevent post car collision fires.

BACKGROUND AND PRIOR ART

Over the years, fires have been caused from vehicle collisions, Post collisions, electricity from battery connected damaged wires with or without sparks caused have ignited dangerous fires from fuel caused by broken fuel lines as well in other combustible materials. These post collision vehicle fires are caused substantial property damage as well as serious harm to vehicle occupants.

Various devices have been proposed over the years to interrupt electricity in a vehicle, after a collision. See for example, U.S. Pat. No. 4,000,408 to McCartney; U.S. Pat. No. 4,195,897 to Plevjak; U.S. Pat. No. 4,191,868 to Sunde; U.S. Pat. No. 4,310,817 to McNiel; U.S. Pat. No. 4,397,372 to De Kraker; U.S. Pat. No. 4,524,287 to Brannen; U.S. Pat. No. 5,777,285 to Frank et al.; U.S. Pat. No. 7,460,344 to Hastings et al.; U.S. Pat. No. 9,539,889 to Lim; and U.S. Published Patent Applications 2004/0256169 to Budzilovich et al.; 2005/0093371 to Zdziech et al. and 2006/0137929 to Yoshida.

However, these devices have problems that include being easily activated to interrupt electricity from minor impacts, not being activated to interrupt electricity from collisions in all directions, prone to failure, expensive and/or difficult to install, and may further allow electricity to become reconnected after the collision causing further damage.

Thus, the need exists for solutions to the above problems with the prior art.

SUMMARY OF THE INVENTION

A primary objective of the present invention is to provide safety devices, systems, and methods by automatically interrupting electricity from a vehicle electricity supply, such as a vehicle battery to prevent post car collision fires A secondary objective of the present invention is to safety devices, systems, and methods by automatically interrupting electricity within a vehicle, to prevent post car collision fires when the vehicle has been impacted in a collision from any direction.

A third objective of the present invention is to safety devices, systems, and methods by automatically interrupting electricity from a vehicle electricity supply, such as a vehicle battery from a collision to prevent post collision fires, and which prevents electricity from being reconnected from the electricity supply after the collision.

A fourth objective of the present invention is to safety devices, systems, and methods which can be easily and quickly mounted in any vehicle that will automatically interrupting electricity from a vehicle electricity supply, such as a vehicle battery from a collision to prevent post collision fires.

A fifth objective of the present invention is to safety devices, systems, and methods by automatically interrupting electricity from a vehicle electricity supply, such as a vehicle battery to a fuel pump after a collision to prevent post collision fires.

A sixth objective of the present invention is to automatically interrupt electricity to any electrically powered mechanisms in a vehicle after a collision to prevent post collision fires.

An embodiment of an electricity interrupter safety device, can include a housing having a top section with a top terminal extending therefrom, the top section attached to a bottom section having a bottom terminal extending therefrom, with a chamber formed between the top section and the bottom section; a weighted conductive ball spring positioned between an upper compressed spring and a bottom compressed spring inside the housing, wherein a conductive path runs between the top terminal, the upper spring, the weighted conductive ball, the bottom spring and the bottom terminal of the housing; and a mount for mounting the housing to a battery in a vehicle, the bottom terminal of the housing is attached to a positive terminal of the vehicle battery, and the top terminal of the housing becomes the positive terminal of the battery to provide an electrical connection with a negative terminal of the battery, wherein a collision of the vertical causes the weighted conductive ball to become dislodged from the upper compressed spring and the bottom compressed spring interrupting electricity from the vehicle battery.

The mount can include a clamp for attaching the bottom terminal of the housing to the positive terminal of the vehicle battery.

The chamber can be a circumferential chamber surrounding the weighted conductive ball in 360 degrees.

The circumferential chamber can include tapered interior walls which reduce height within the chamber from about the weighted conductive ball to have a narrower height further distanced away from the weighted conductive ball.

The tapered interior walls generally form V shapes circumferentially about the weighted conductive ball.

The electricity interrupter safety device can further include a top concave ball contact and a bottom concave ball contact, wherein the top cylindrical concave ball contact and the bottom cylindrical ball contact, allow the weighted conductive ball to be rotatably supported between the upper spring and the bottom spring.

The electricity interrupter safety device can further include a top ring member adjacent the top concave ball contact and a bottom ring member adjacent the bottom ball contact. The top ring member and the bottom ring member can be Teflon bushings.

The electricity interrupter safety device can further include a top metal secure ring between the top bushing member and the top terminal and a bottom secure ring between the bottom bushing member and the bottom terminal.

The electricity interrupter safety device can further include a top spiral wire connector between the top spring and the top terminal and a bottom spiral wire connector between the bottom spring and the bottom terminal.

A method for interrupting electricity from a vehicle battery, can include the steps of: providing a housing from an upper portion and a bottom portion, with interior walls forming a circumferential chamber inside the housing which tapers down from a larger height midportion to a narrower height outer portion; positioning a weighted metal ball between compressed springs in the midportion of the chamber in the housing; forming an electrical connection in the housing through the compressed springs about the weighted metal ball through the bottom portion of the housing; mounting the housing in a vehicle to a positive terminal of a vehicle battery so that an electrical connection runs from the positive terminal of the battery through the housing to a negative terminal of the vehicle battery; and interrupting electricity from the vehicle battery when a collision causes the weighted ball to fall out from the compressed springs inside the housing.

The method can further include the steps of providing a top terminal extending from the upper portion of the housing and providing a bottom terminal extending from the bottom portion of the housing.

The mounting step can include providing a clamp for attaching the bottom terminal of the housing the positive terminal of the vehicle battery.

The method can further include the steps of providing a top cylindrical concave ball contact and providing a bottom cylindrical concave ball contact, wherein the top cylindrical concave ball contact and the bottom cylindrical ball contact, allow the weighted conductive ball to be rotatably supported between the upper spring and the bottom spring.

The method can further include the steps of providing a top bushing member on top of the top cylindrical concave ball contact and providing a bottom bushing member below the bottom cylindrical ball contact.

The method can further include the steps of providing a top metal secure ring between the top bushing member and the top terminal and providing a bottom secure ring between the bottom bushing member and the bottom terminal.

The method can further include the steps of providing a top spiral wire connector between the top spring and the top terminal and providing a bottom spiral wire connector between the bottom spring and the bottom terminal.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Figure 1:
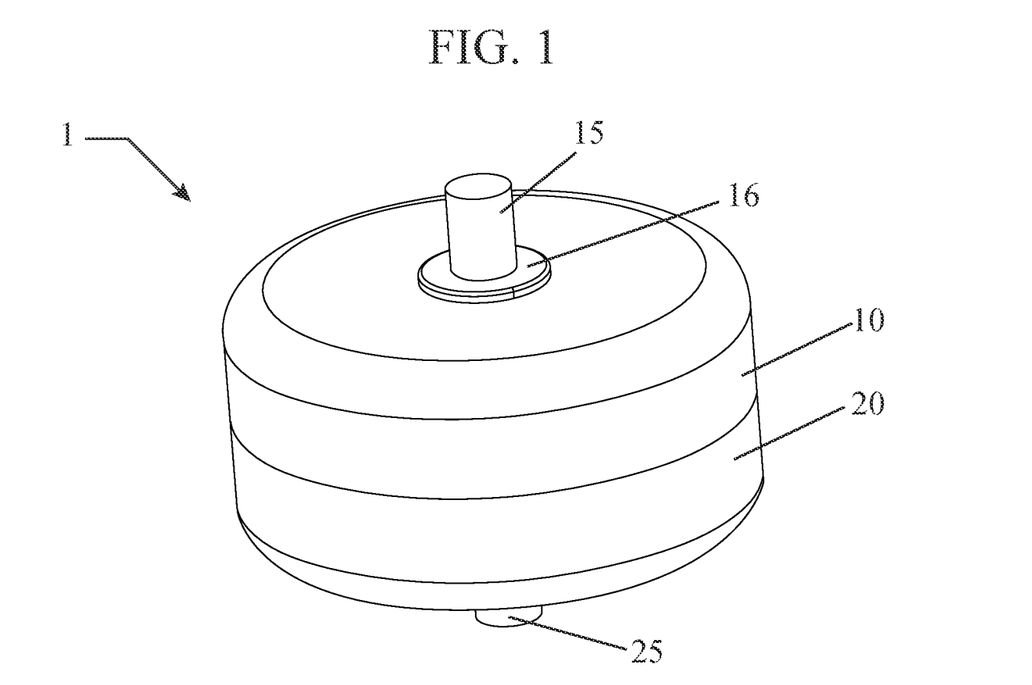
FIG. 1 is an upper front perspective view of the assembled electricity interrupter vehicle safety device.
Figure 2:
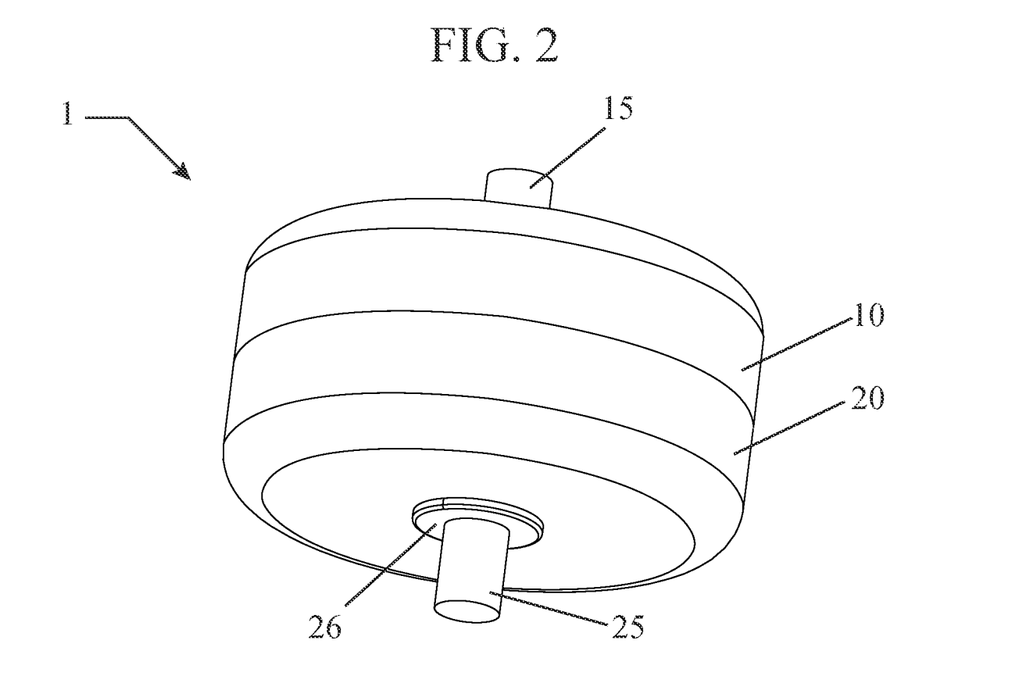
FIG. 2 is a lower front perspective view of the assembled electricity interrupter vehicle safety device of FIG. 1.

A list of components will now be described.
1 electricity interrupter device
10 top half housing
15 top conductor rod
16 top conductor terminal contact base
17 top terminal contact base
20 bottom half housing
25 bottom conductor rod
26 bottom conductor terminal contact base
27 bottom terminal contact base
30T top metal secure ring
30B bottom metal secure ring
31T top compression spring
31B bottom compression spring
32T top spiral wire
32B bottom spiral wire
33T top Teflon ring
33B bottom Teflon ring
34T top concave ball contact
34B bottom concave ball contact
35T top nonconductive bushing
35B bottom nonconductive bushing
40 weighted metal ball
50 circumferential chamber
52 V shaped left side with tapered outer walls
53 narrow height left end
54 V shaped right side with tapered outer walls
55 narrow height right end
60 tongue and groove connectors
80 Device Clamp
100 Vehicle battery
110 positive terminal
112 positive cable
115 positive terminal clamp
120 negative terminal
122 negative cable
125 negative terminal clamp FIG. 1 is an upper front perspective view of the assembled electricity interrupter vehicle safety device 1. FIG. 2 is a lower front perspective view of the assembled electricity interrupter vehicle safety device 1 of FIG. 1.

Figure 3:
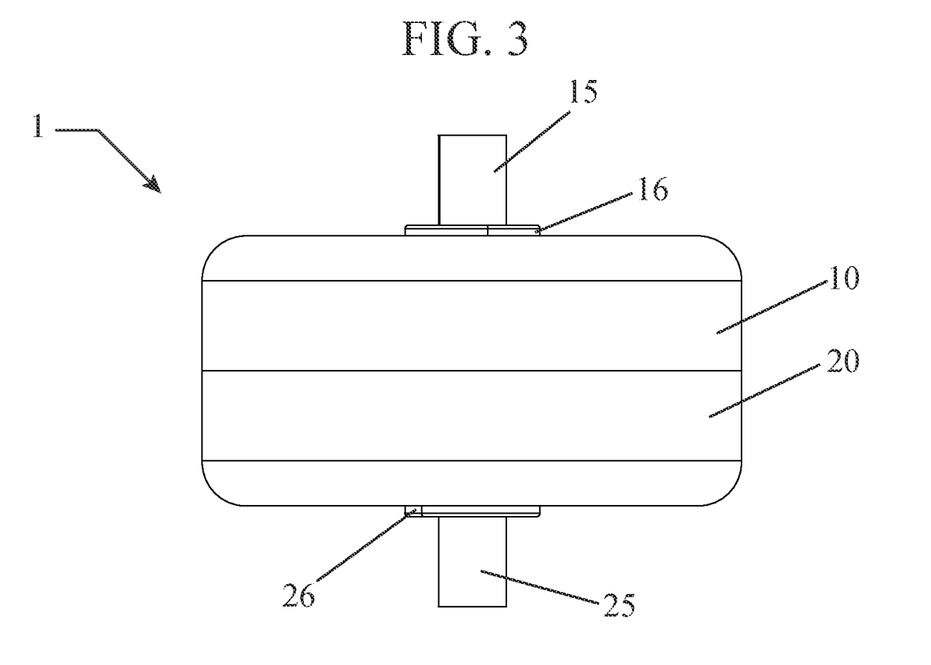
FIG. 3 is a front view of the assembled electricity interrupter vehicle safety device of FIG. 1.
Figure 4:
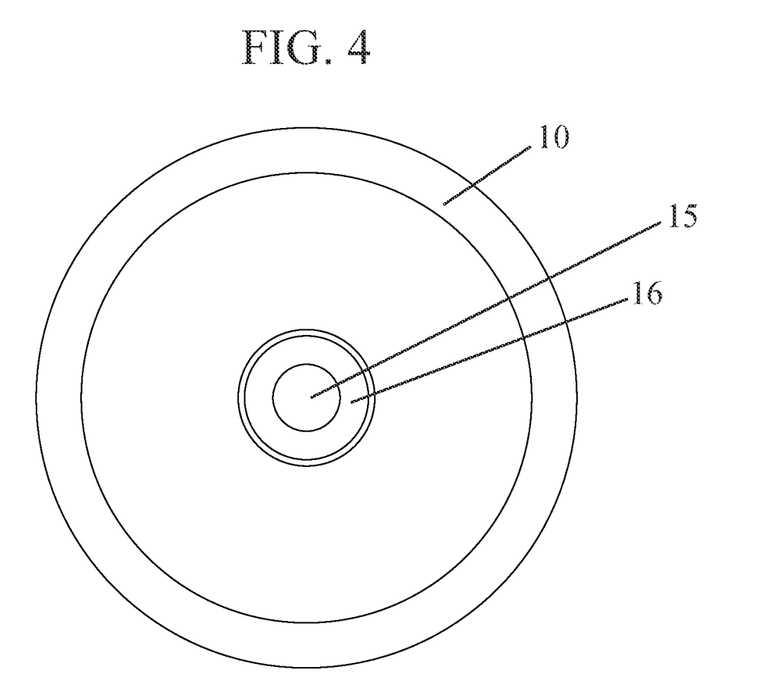
FIG. 4 is a top view of the assembled electricity interrupter vehicle safety device of FIG. 1.

FIG. 3 is a front view of the assembled electricity interrupter vehicle safety device 1 of FIG. 1. FIG. 4 is a top view of the assembled electricity interrupter vehicle safety device 1 of FIG. 1.

Figure 5:
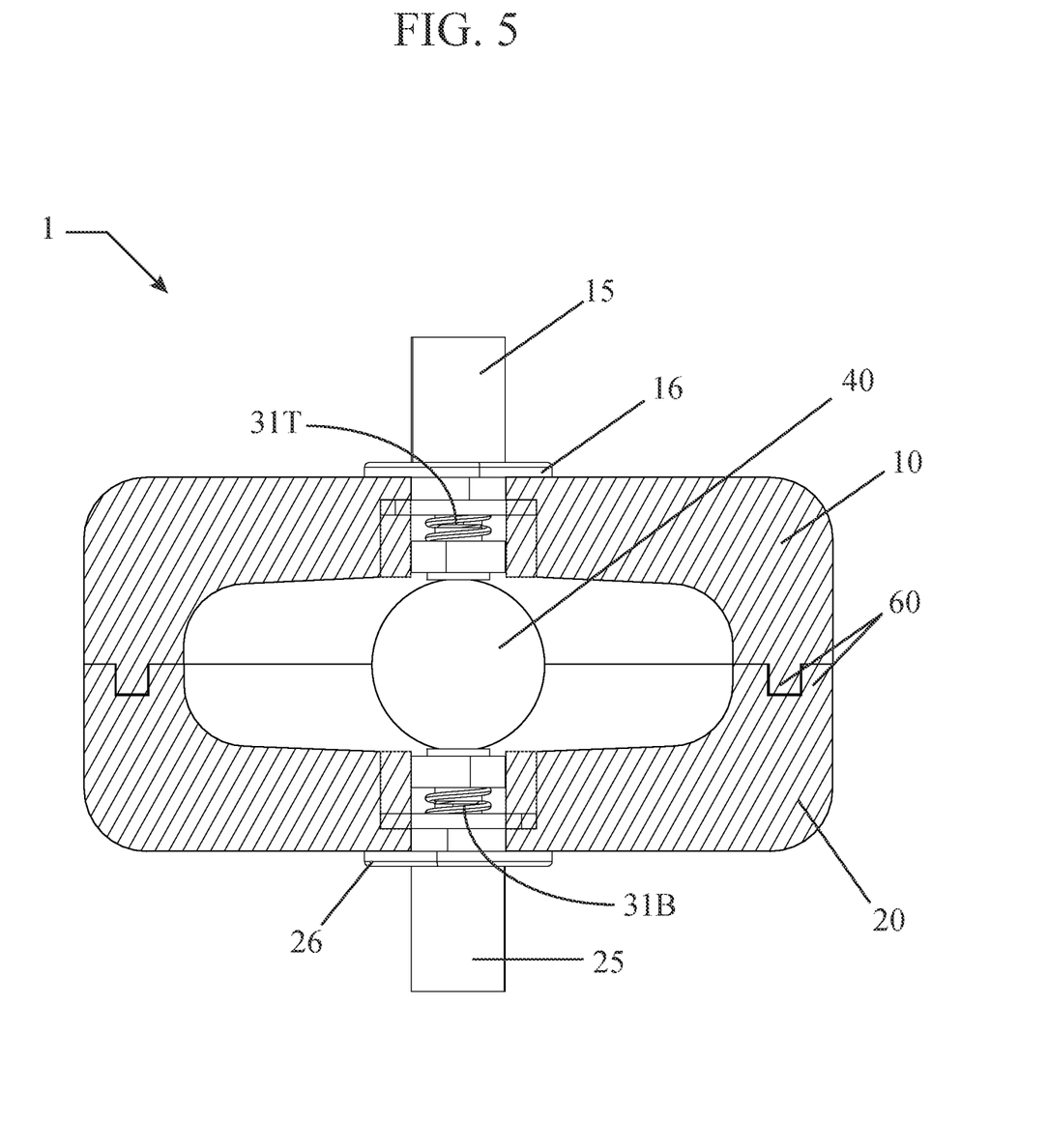
FIG. 5 is a cross-sectional view of the assembled electricity interrupter vehicle safety device of FIG. 1.
Figure 6:
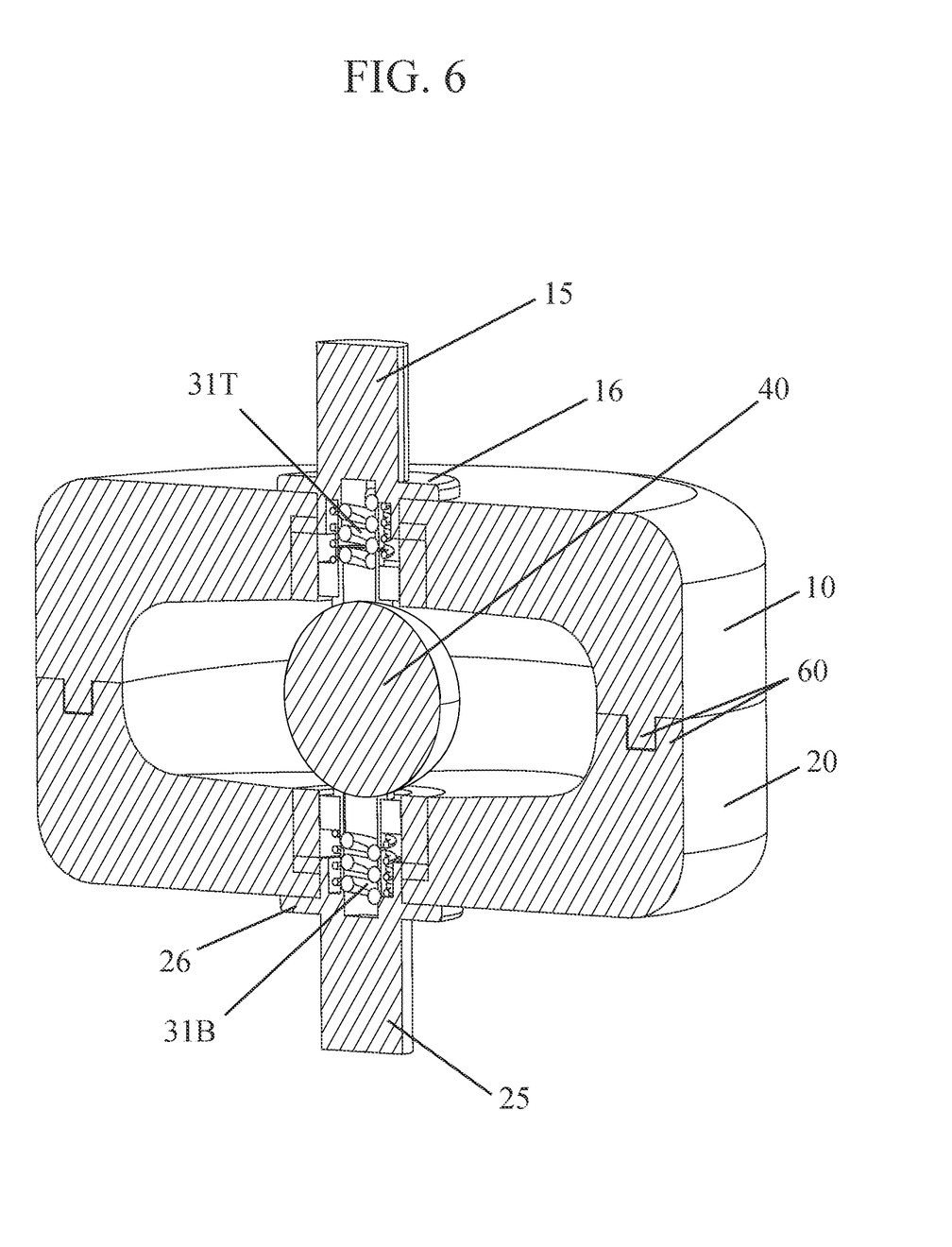
FIG. 6 is a perspective view of FIG. 5.

FIG. 5 is a cross-sectional view of the assembled electricity interrupter vehicle safety device 1 of FIG. 1. FIG. 6 is a perspective view of FIG. 5.

Figure 7:
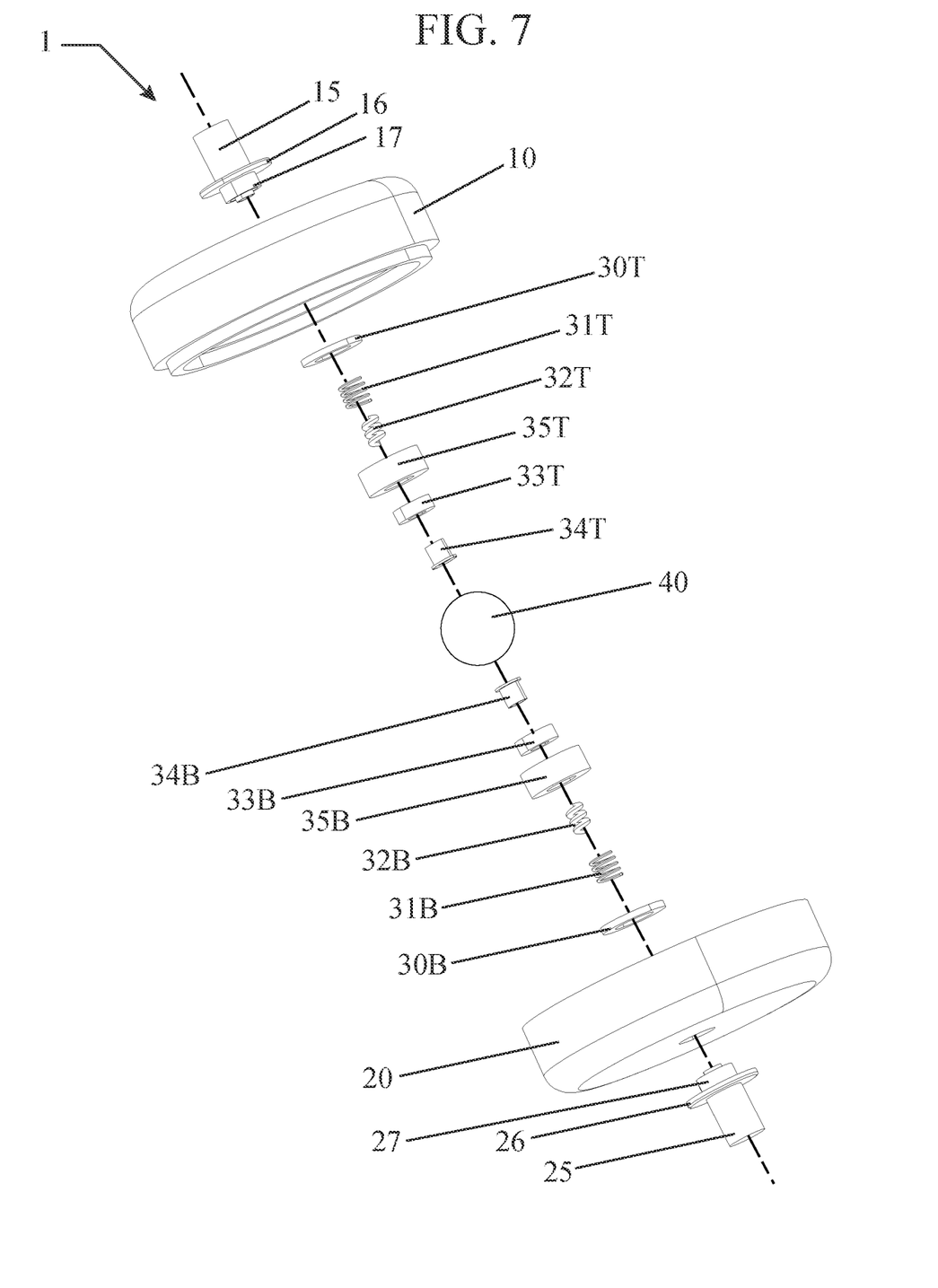
FIG. 7 is an exploded view of the components of the electricity interrupter vehicle safety device of FIG. 1.

FIG. 7 is an exploded view of the components 10-40 of the electricity interrupter vehicle safety device 1 of FIG. 1.

Figure 8:
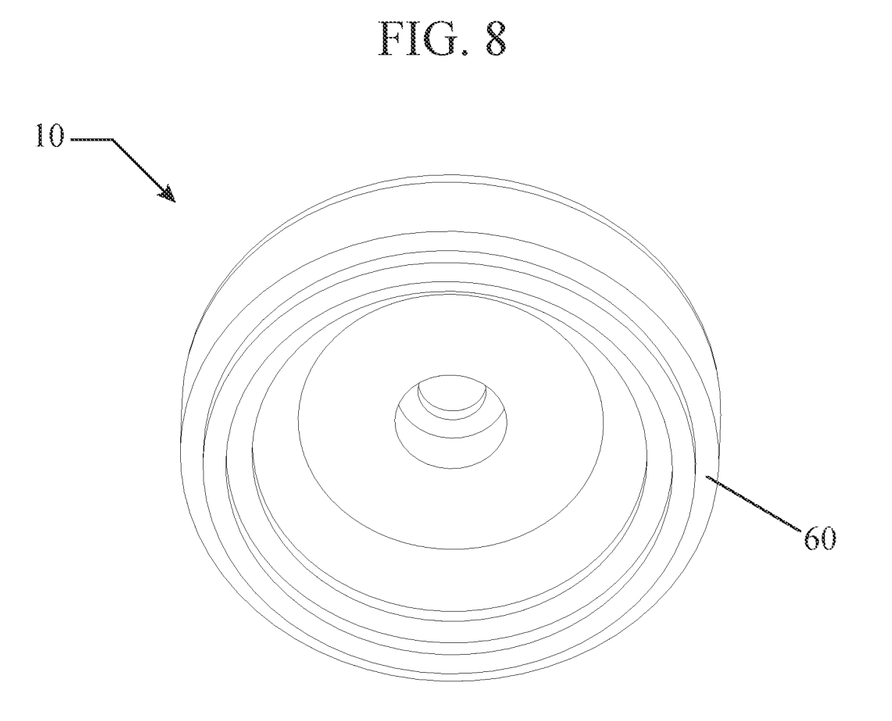
FIG. 8 is an inside upper perspective view of the top half portion of the electricity interrupter vehicle safety device of the preceding figures.

FIG. 8 is an inside upper perspective view of the top half portion 10 of the electricity interrupter vehicle safety device 1 of the preceding figures.

Figure 9:
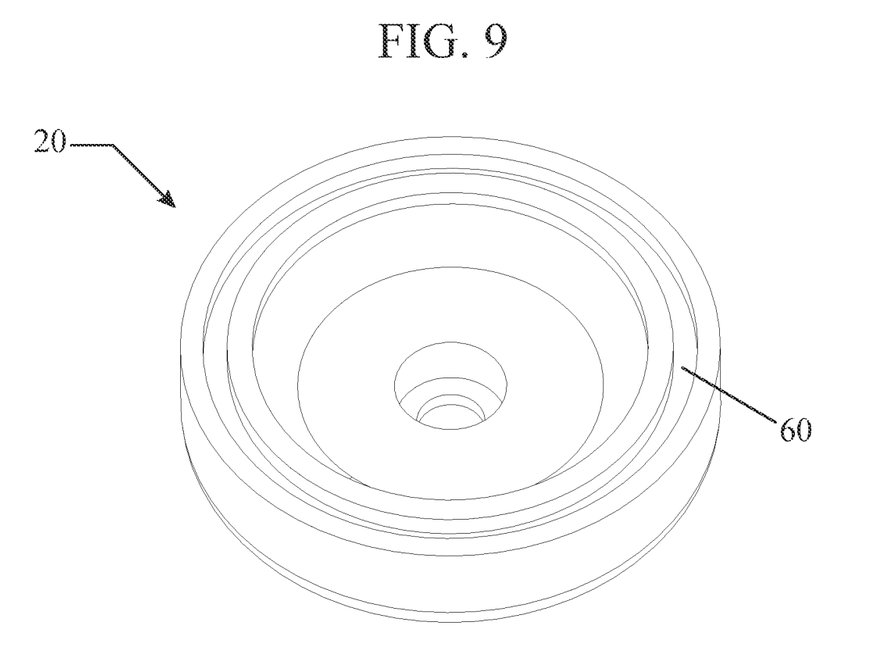
FIG. 9 is an inside lower perspective view of the bottom half portion of the electricity interrupter vehicle safety device of the preceding figures.

FIG. 9 is an inside lower perspective view of the bottom half portion 20 of the electricity interrupter vehicle safety device of the preceding figures.

Referring to FIGS. 1-9, the electricity interrupter vehicle safety device 1 includes a top half housing 10 attached by connectors 60, such as but not limited to tongue and groove members to connect the top half housing 10 to the bottom half housing 20.

The top half housing 10 and the bottom half housing 20 can be formed from premolded nonconductive materials, such as but not limited to nylon, polyurethane, and the like.

The assembled electricity interrupter vehicle safety device 1 forms a generally appearing disc shape.

Referring to FIGS. 1-9, extending upward from the top half housing 10 is a conductive top conductor rod 15 that can be formed from a conductive metal material, and the like, with a top conductor terminal contact base 16 abutting a top of the top half housing 10. Top conductor rod 15, top conductor terminal base 16 and top terminal contact base 17 can be formed into one-piece.

Referring to FIGS. 1-8, extending downward from the bottom half housing 20 is a conductive bottom conductor rod 25 that can be formed from a conductive metal material, and the like, with a bottom conductor terminal contact base 26.

Bottom conductor rod 25, bottom conductor terminal base 26 and bottom terminal contact base 27 can be formed into one-piece.

Within the top half housing 10 can be a top terminal contact base 17 that extends into a top opening in the top half housing 10 with a top metal secure ring 30T, with a top wire spiral connector 31T connected to a top compression spring 32T with a top Teflon bushing 33T with top bushing insert 34T and a top concave ball contact 35T.

Within the bottom half housing 20 can be a bottom terminal contact base 27 that extends into a bottom opening in the bottom half housing 10 with a bottom metal secure ring 30B, with a bottom compression spring 31B connected to a bottom spiral wire 32B with a bottom Teflon ring 33B with a bottom ball contact 34B and a bottom nonconductive bushing 35B.

The assembled components 31T, 32T, 33T, 34T, 35T and 31B, 32B, 33B, 34B and 35B compress against the top and bottom of a weighted metal ball 40 which is supported and oriented at a generally midpoint location in the assembled electricity interrupter device 1.

The weighted conductive ball 40 spring loaded in a position between the top compressed spring 31T, top spiral wire 32T, top concave ball contact 34T, and a bottom compressed spring 31B, bottom spiral wire 32B, bottom concave ball contact 34B, inside the housing 1 allows for a conductive path and conductive connection to run between the top terminal 15 and the bottom terminal 25 of the housing 1.

Figure 10:
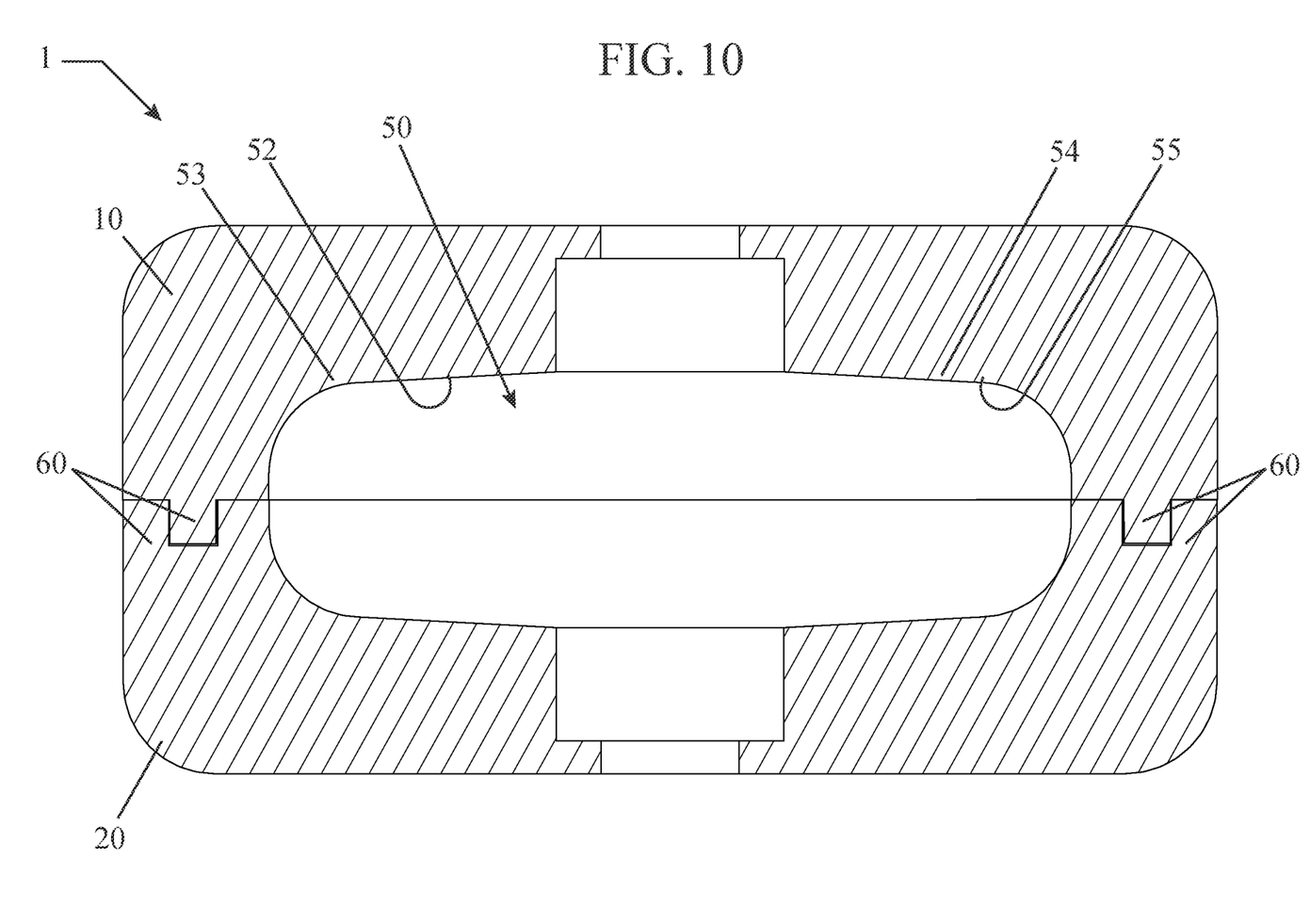
FIG. 10 is a cross-sectional view showing the interior chamber the assembled electricity interrupter vehicle safety device of FIGS. 1-3 without interior components.

FIG. 10 is a cross-sectional view showing the interior chamber the assembled electricity interrupter vehicle safety device 1 of FIGS. 1-3 without interior components. Within the assembled electricity interrupter vehicle safety device 1 can be a circumferential chamber 50 that in cross-sectional view has a generally V shaped left side 52 with tapered outer walls that taper down to a narrower height adjacent to a narrow height left end 53. In the cross-sectional view, the assembled device 1 has a generally V shaped right side 54 with tapered outer walls that taper down to a narrower height adjacent to a narrow height right end 55.

FIGS. 5-6 show the orientation of the weighted metal ball 40 in the assembled electricity interrupter vehicle safety device 1 after being initially mounted in a vehicle, which will be discussed later.

Figure 11:
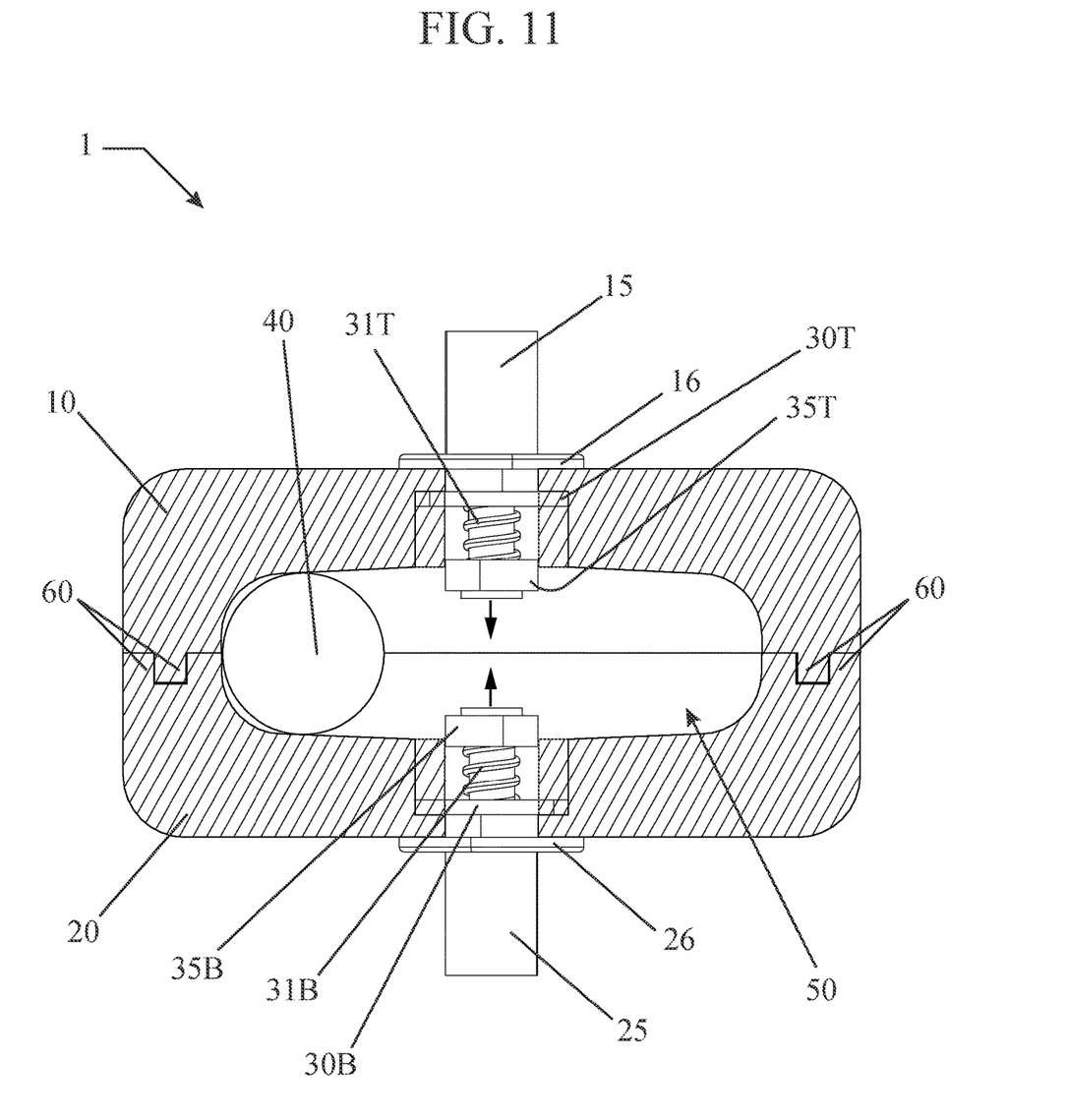
FIG. 11 is another cross-sectional view of the assembled electricity interrupter vehicle safety device of FIGS. 5-6 after a collision.

FIG. 11 is another cross-sectional view of the vehicle mounted assembled electricity interrupter vehicle safety device 1 of FIGS. 5-6 after the vehicle is involved in a collision in any direction.

Figure 12:
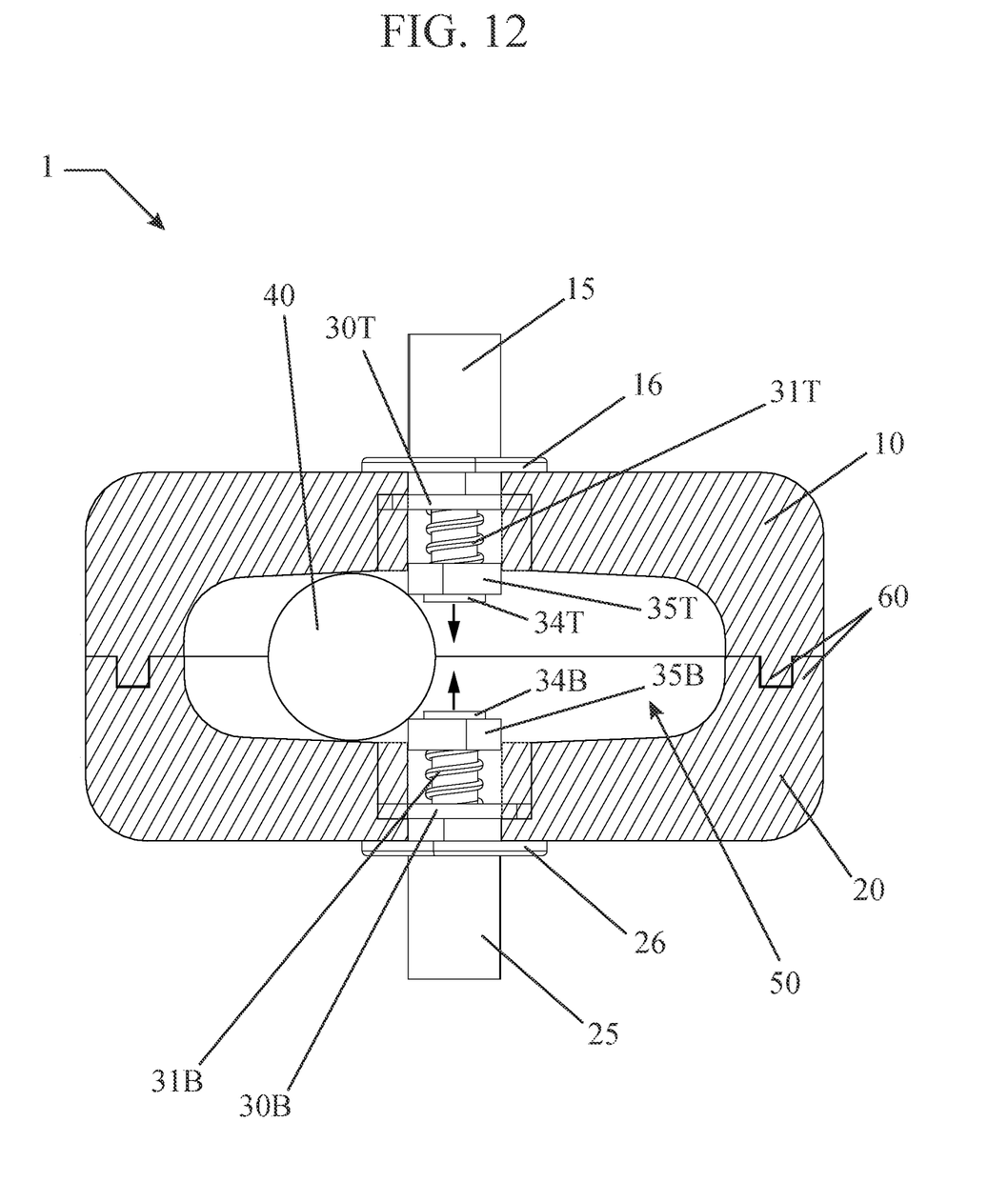
FIG. 12 is still another cross-sectional view of the assembled electricity interrupter vehicle safety device of FIGS. 5-6 after a collision.

FIG. 12 is still another cross-sectional view of the vehicle mounted assembled electricity interrupter vehicle safety device 1 of FIGS. 5-6 after the vehicle is involved in a collision in any direction.

FIG. 12 shows the weighted metal ball 40, after a collision being prevented from being repositioned between the concave contacts 34T and 34B, since the expanded springs 31T, 31B with nonconductive bushings 35T, 35B now block the ball 40 from being repositioned directly between the concave contacts 34T, 34B. As such, electrical power through terminals 15 and 25 cannot be automatically reconnected after a collision.

FIGS. 11 and 12 show that the original electrically conductive path between the top conductor rod 15 and bottom conductor rod 25 is now broken, where no electrically conductive path exists therebetween.

Referring to FIGS. 5, 6, 11 and 12, a collision in any direction can cause the weighted metal ball 40 to become dislodged from its' initial spring biased midpoint position in the circumferential chamber 50 to move in a sideways direction and become wedged the further away from the initial midpoint position. The new wedged location does not allow the weighted metal ball 40 to move back to the now closed off space between the top concave contact 35T and bottom concave contact 35B, which now extend inward.

The device 1 safely eliminates the risk of post-crash fires by interrupting the electrical flow that otherwise can produce sparks coming from separated electrical wires and volatility of fuel broken lines. The device 1 can also disconnect fuel pumps to further reduce the risk of fire.

The spring compressions of compression springs 31T and 31B can be calibrated by applying more or less tension to selected threshold values to allow the weighted metal ball 40 to become dislodged to break the electrical path circuit between top conductor rod 15 and bottom conductor rod 25. For example, selected threshold values can be calculated similar to those used with vehicle air bag actuation. See for example, U.S. Pat. No. 5,053,588 to Bolender; U.S. Pat. No. 6,115,659 to Buchheim et al.; U.S. Pat. No. 6,424,899 to Imai et al.; U.S. Pat. No. 6,748,307 to Sala et al. and U.S. Published Patent Application 2004/0243294 to Miyata et al., which are all incorporated by reference in their entirety.

Figure 13A:
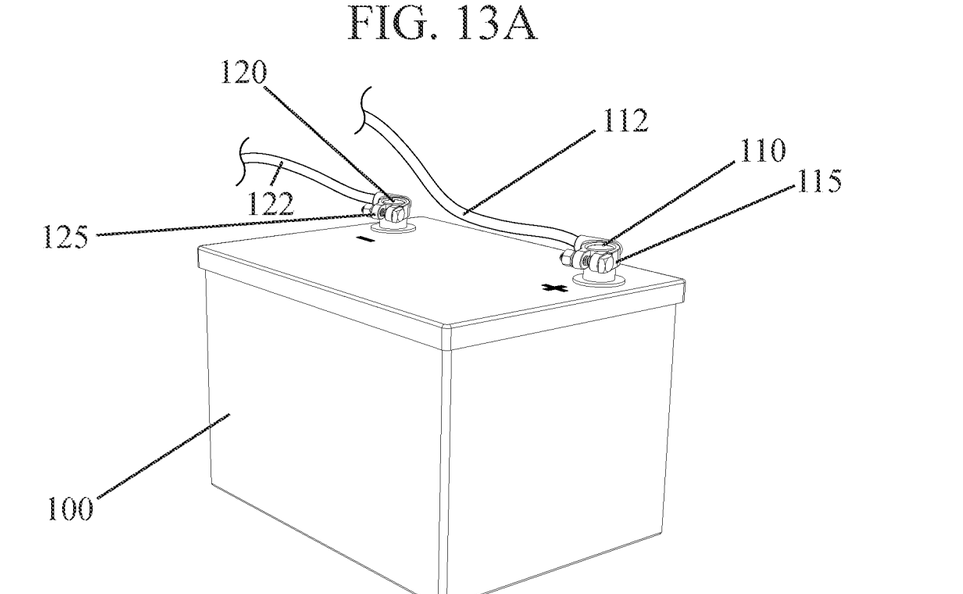
FIG. 13A is a perspective view of a battery with cables attached to battery terminals.

FIG. 13A is a perspective view of a battery 100 with cables 112, 122 attached to battery terminals 110 and 120.

Figure 13B:
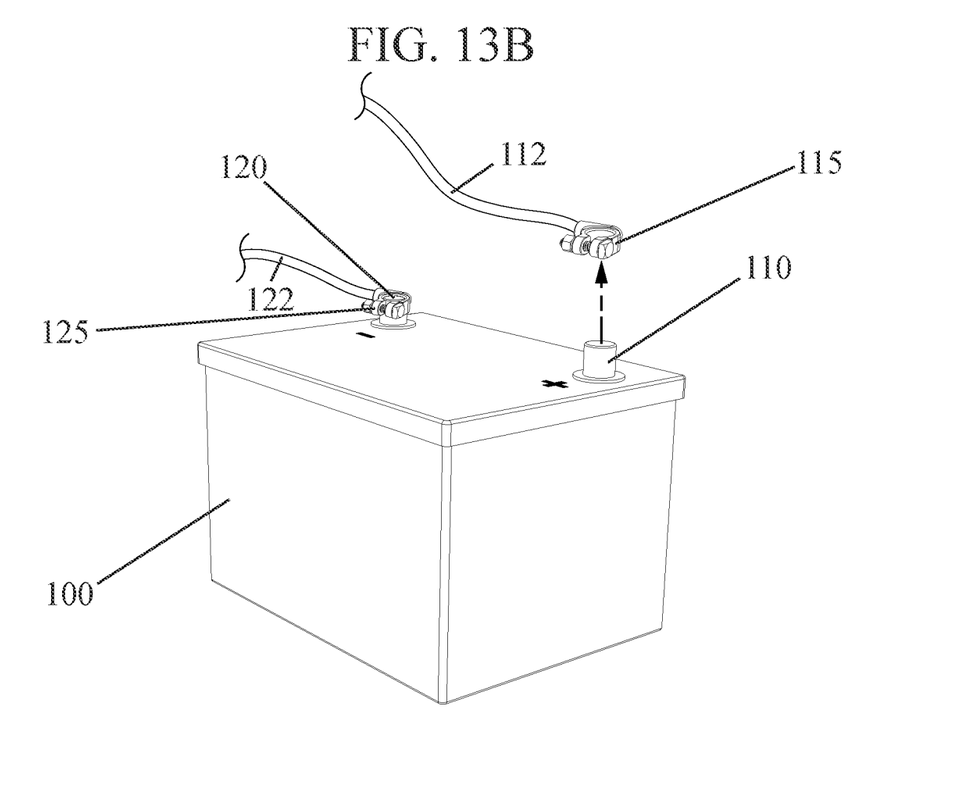
FIG. 13B is a perspective view of FIG. 13A with the battery cable shown in FIG. 13A detached from the positive battery terminal.

FIG. 13B is a perspective view of FIG. 13A with the positive battery cable 112 shown in FIG. 13A detached from the positive battery terminal 110.

Figure 14:
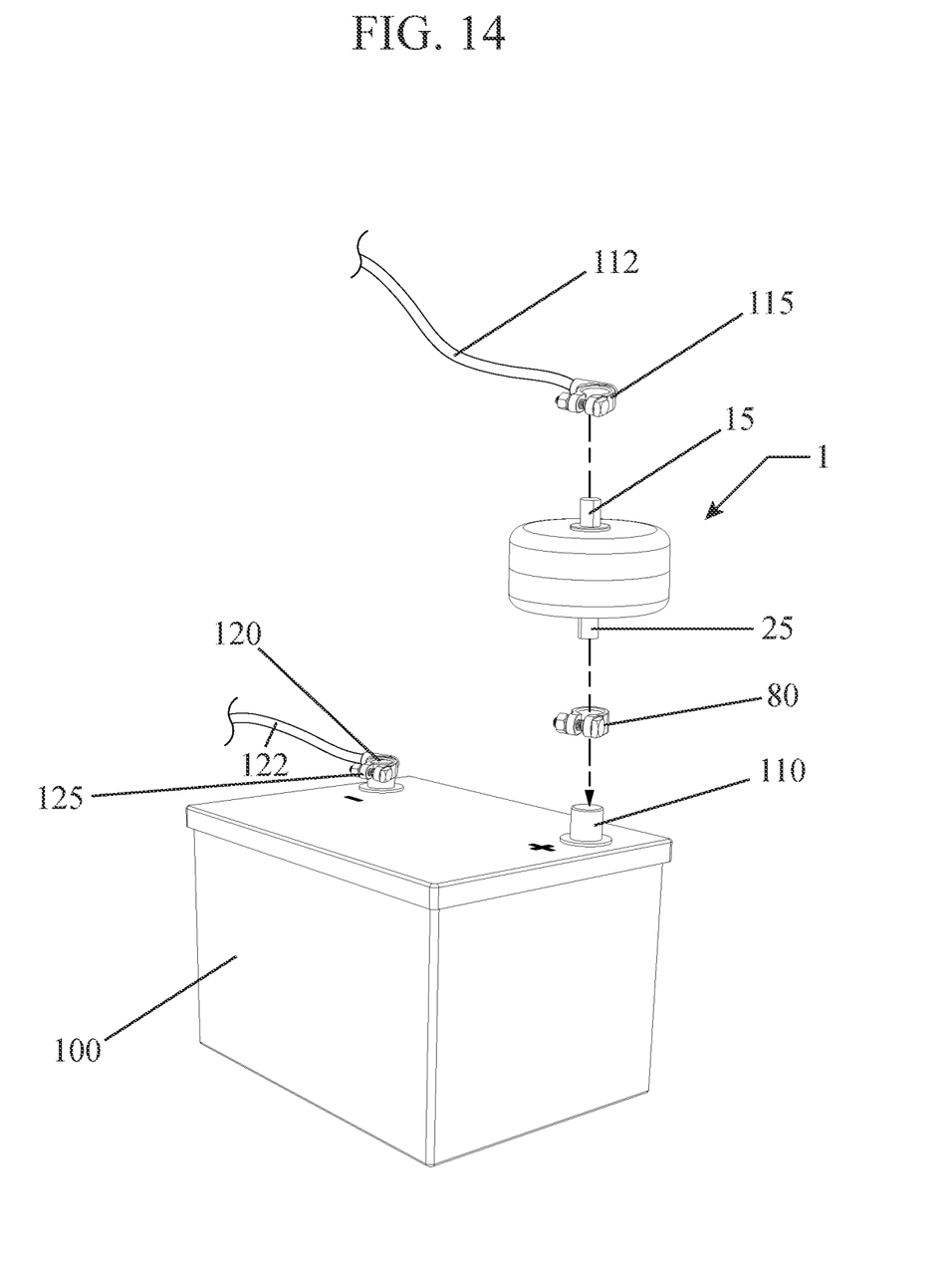
FIG. 14 is a perspective view of the assembled electricity interrupter vehicle safety device of FIGS. 1-3 ready to be installed to the positive terminal of the battery shown in FIG. 13B.

FIG. 14 is a perspective view of the assembled electricity interrupter vehicle safety device 1 of FIGS. 1-3 ready to be installed to the positive terminal 110 of the battery 100 shown in FIG. 13B.

Figure 15:
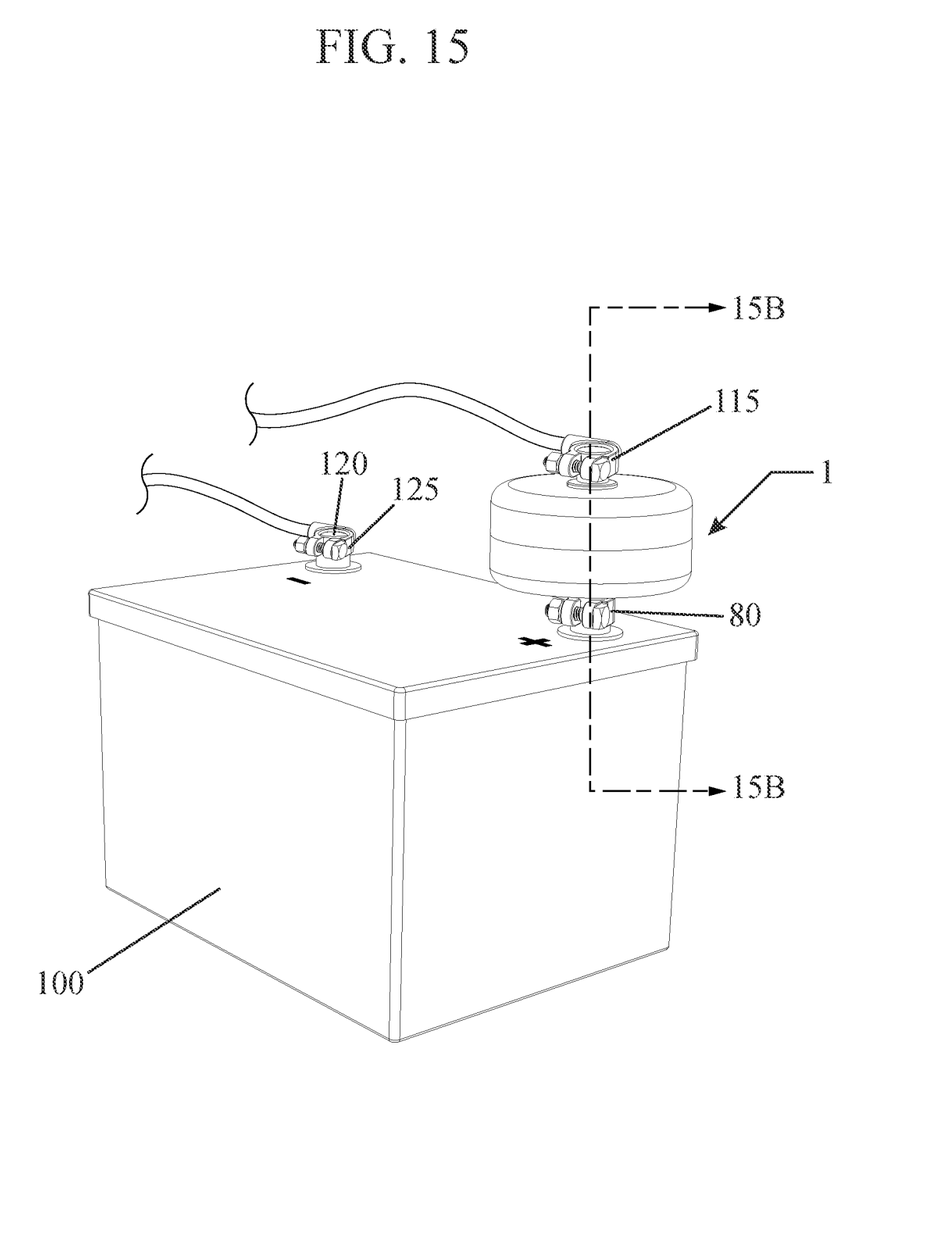
FIG. 15 is a perspective view of the assembled electricity interrupter vehicle safety device of FIGS. 1-3 now clamped to the positive terminal battery shown in FIGS. 13B and 14.

FIG. 15 is a perspective view of the assembled electricity interrupter vehicle safety device 1 of FIGS. 1-3 now clamped by device clamp 80 to the positive terminal 110 of the battery 100 shown in FIGS. 13B and 14.

Figure 15B:
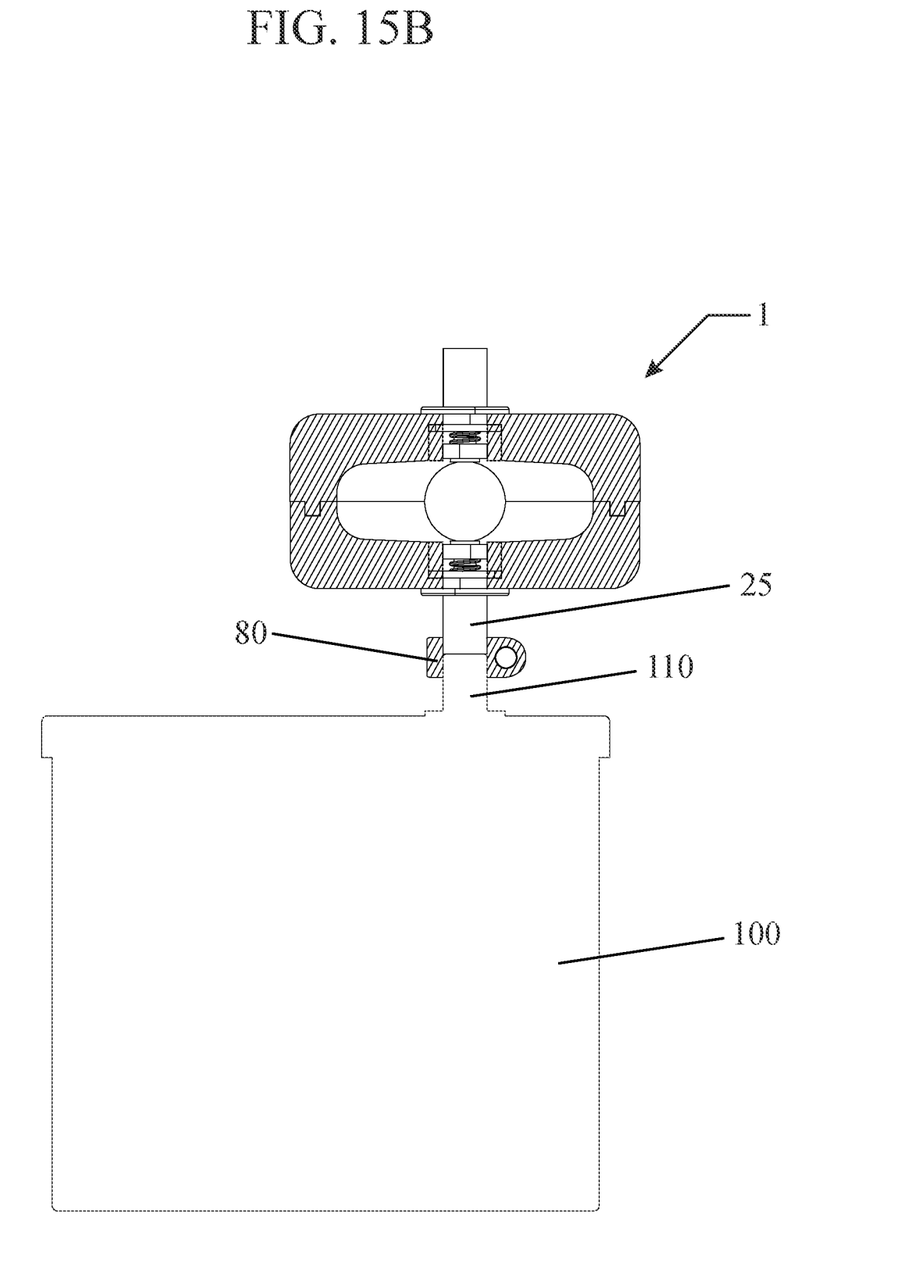
FIG. 15B is a cross-sectional view of the clamped portion of the assembled electricity interrupter vehicle safety device of FIGS. 1-3 now clamped to the positive terminal shown in FIG. 15.

FIG. 15B is a cross-sectional view of the clamped portion of the assembled electricity interrupter vehicle safety device 1 of FIGS. 1-3 now clamped to the positive terminal 110 shown in FIG. 15. The bottom conductor rod 25 of the safety device 1 is stacked on the positive battery terminal 110 and clamped in place by device clamp 80.

Although the application discloses an embodiment for connecting the electricity interrupter device to the posts of a vehicle battery in an engine compartment of the motor vehicle, the electricity interrupter device can be mounted with aid of a bracket in other locations, such as being attached to another part of the vehicle, such as under the hood, elsewhere in the engine compartment, on or behind the firewall, and the like.

The electricity interrupter device can be scaled up or scaled down to different sizes as needed for selected applications and locations in a vehicle.

While the application discloses disconnecting electricity from a vehicle battery in a combustion engine, the application can be used to disrupt electricity from other electricity sources, such as but not limited to electricity generated from electricity in electric vehicles, electricity generated from fuel cells, and the like.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member or a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The term "approximately" is similar to the term "about" and can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An electricity interrupter safety device, comprising:
    a housing having a top section with a top terminal extending therefrom, the top section attached to a bottom section having a bottom terminal extending therefrom, with a chamber formed between the top section and the bottom section;
    a weighted conductive ball spring positioned between an upper compressed spring and a bottom compressed spring inside the housing, wherein a conductive path runs between the top terminal, the upper spring, the weighted conductive ball, the bottom spring and the bottom terminal of the housing;
    a circumferential chamber surrounding the weighted conductive ball in 360 degrees, wherein the circumferential chamber includes tapered interior walls which reduce height within the chamber from about the weighted conductive ball to have a narrower height further distanced away from the weighted conductive ball; and
    a mount for mounting the housing to a battery in a vehicle, the bottom terminal of the housing is attached to a positive terminal of the vehicle battery, and the top terminal of the housing becomes the positive terminal of the battery to provide an electrical connection with a negative terminal of the battery, wherein a collision of the vertical causes the weighted conductive ball to become dislodged from the upper compressed spring and the bottom compressed spring interrupting electricity from the vehicle battery.

2. The electricity interrupter safety device of claim 1, wherein the mount includes:
a clamp for attaching the bottom terminal of the housing to the positive terminal of the vehicle battery.

3. The electricity interrupter safety device of claim 1, wherein the tapered interior walls generally form V shapes circumferentially about the weighted conductive ball.

4. The electricity interrupter safety device of claim 1, further comprising:
a top cylindrical concave ball contact; and
a bottom cylindrical concave ball contact, wherein the top cylindrical concave ball contact and the bottom cylindrical concave ball contact, allow the weighted conductive ball to be rotatably supported between the upper spring and the bottom spring.

5. The electricity interrupter safety device of claim 4, further comprising:
a top ring member adjacent the top concave ball contact; and
a bottom ring member adjacent the bottom ball contact.

6. The electricity interrupter safety device of claim 5, wherein the top ring member and the bottom ring member are Teflon bushings.

7. The electricity interrupter safety device of claim 4, further comprising:
a top metal secure ring between a top bushing member and the top terminal; and
a bottom secure ring between a bottom bushing member and the bottom terminal.

8. The electricity interrupter safety device of claim 1, further comprising:
a top spiral wire connector between the top spring and the top terminal; and
a bottom spiral wire connector between the bottom spring and the bottom terminal.

9. A method for interrupting electricity from a vehicle battery, comprising the steps of: providing a housing from an upper portion and a bottom portion, with interior walls forming a circumferential chamber inside the housing which tapers down from a larger height midportion to a narrower height outer portion; positioning a weighted metal ball between compressed springs in the midportion of the chamber in the housing; providing a top cylindrical concave ball contact; and providing a bottom cylindrical concave ball contact, wherein the top cylindrical concave ball contact and the bottom cylindrical concave ball contact, allow the weighted conductive ball to be rotatably supported between the upper spring and the bottom spring; forming an electrical connection in the housing through the compressed springs about the weighted metal ball through the bottom portion of the housing; mounting the housing in a vehicle to a positive terminal of a vehicle battery so that an electrical connection runs from the positive terminal of the battery through the housing to a negative terminal of the vehicle battery; interrupting electricity from the vehicle battery when a collision causes the weighted ball to fall out from the compressed springs inside the housing.

10. The method of claim 9, wherein the step of providing the housing includes the steps of:
providing a top terminal extending from the upper portion of the housing; and
providing a bottom terminal extending from the bottom portion of the housing.

11. The method of claim 9, wherein the mounting step includes the step of:
the mount includes:
providing a clamp for attaching the bottom terminal of the housing the positive terminal of the vehicle battery.

12. The method of claim 9, further comprising the steps of: providing a top bushing member on top of the top cylindrical concave ball contact; and providing a bottom bushing member below the bottom cylindrical ball contact.

13. The method of claim 12, further comprising the steps of:
providing a top metal secure ring between the top bushing member and the top terminal; and
providing a bottom secure ring between the bottom bushing member and the bottom terminal.

14. The method of claim 13, further comprising the steps of:
providing a top spiral wire connector between the top spring and the top terminal; and
providing a bottom spiral wire connector between the bottom spring and the bottom terminal.

15. An electricity interrupter safety device, comprising:
a housing having a top section with a top terminal extending therefrom, the top section attached to a bottom section having a bottom terminal extending therefrom, with a chamber formed between the top section and the bottom section;
a weighted conductive ball spring positioned between an upper compressed spring and a bottom compressed spring inside the housing, wherein a conductive path runs between the top terminal, the upper spring, the weighted conductive ball, the bottom spring and the bottom terminal of the housing;
a top cylindrical concave ball contact;
a bottom cylindrical concave ball contact, wherein the top cylindrical concave ball contact and the bottom cylindrical concave ball contact, allow the weighted conductive ball to be rotatably supported between the upper spring and the bottom spring; and
a mount for mounting the housing to a battery in a vehicle, the bottom terminal of the housing is attached to a positive terminal of the vehicle battery, and the top terminal of the housing becomes the positive terminal of the battery to provide an electrical connection with a negative terminal of the battery, wherein a collision of the vertical causes the weighted conductive ball to become dislodged from the upper compressed spring and the bottom compressed spring interrupting electricity from the vehicle battery.

\* \* \* \* \*